UNITED STATES PATENT OFFICE.

JAMES O. HANDY, OF PITTSBURGH, PENNSYLVANIA, ASSIGNOR, BY MESNE ASSIGNMENTS, TO MACBETH-EVANS GLASS COMPANY, OF PITTSBURGH, PENNSYLVANIA, A CORPORATION OF PENNSYLVANIA.

ILLUMINATING-GLASS.

1,287,005.  Specification of Letters Patent.  Patented Dec. 10, 1918.

No Drawing.  Application filed April 11, 1917.  Serial No. 161,335.

*To all whom it may concern:*

Be it known that I, JAMES O. HANDY, a citizen of the United States, residing at Pittsburgh, in the county of Allegheny and State of Pennsylvania, have invented a certain new and useful Illuminating-Glass, of which the following is a specification.

My invention relates to an improvement in illuminating glass such as is used in electric shades and globes. It has for its principal object, the provision of an improved glass of the white semi-translucent Alba type and free from fire, without the use of the fluorin ingredients which have hitherto been considered necessary for the production of glass of this type. The invention has for its further object, the provision of a glass of the type specified of improved appearance which can be cheaply made and which is readily workable.

As illustratve of the batch employed, reference may be had to the following tabular statement, but it will be understood that the batch is capable of considerable variation along the lines hereinafter more fully specified. Following are the ingredients:—

| | |
|---|---|
| Sand | 57.60% |
| Sodium sulfate | .82% |
| Sodium chlorid | .33% |
| Aluminum hydrate | 13.42% |
| Sodium phosphate | 2.78% |
| Calcium carbonate | 2.62% |
| Lead oxid | 3.76% |
| Sodium nitrate | .82% |
| Sodium carbonate | 17.84% |

The foregoing ingredients may be divided up into two classes; first, those which form a foundation mix capable of making substantially colorless clear glass, and second, the opacifying ingredients. The first class includes the sand, calcium carbonate, lead oxid, sodium nitrate and sodium carbonate, while the second class includes the sodium sulfate, sodium chlorid, aluminum hydrate, and sodium prosphate.

It is my theory that the aluminum oxid is the principal coloring compound and that this compound is made effective by the sodium sulfate and sodium chlorid which act to precipitate the oxid, bringing it into a colloidal condition in which form it serves to cloud or color the glass. I also find that the sodium phosphate acts to substantially increase the amount of coloring imparted by the hydrate in connection with the sulfate and chlorid, although a good glass may be produced without the phosphate upon increasing the amount of sulfate and chlorid.

I have also found that the best results are secured by using both the sulfate and the chlorid, but it is possible to dispense with one of these compounds. In such case an equivalent amount of the other compound should be added. Roughly speaking, if sulfate is eliminated, an equal weight of chlorid should be added. The coloring effect of the chlorid, weight for weight, is greater than that of the sulfate, but the chlorid is very volatile so that any adjustment incident to the elimination of one compound may be made upon the basis above set forth. Since the sulfate and the chlorid act in substantially the same way when used in connection with the aluminum hydrate, and since I know of no generic term applicable to these substances, I will use the phrase "an agent having the coloring reaction or effect characteristic of sodium chlorid" as descriptive of both compounds or their equivalents, and it will be understood that such phrase refers to either compound, or a combination of the two compounds.

I have also found that the basic batch has very important bearing upon the coloring imparted by the opacifying agents as set forth herein. With a glass containing a relatively high percentage of silica the opacifying agents are much more effective than in a glass having a low percentage of silica and a relatively greater amount of flux. With a glass having a low silica content, the molten mass is much more fluid and the volatile constituents of the sulfate and chlorid escape so much more rapidly that there is little or no coloring effect. In the formula as set forth heretofore for my glass, the silica content with a sand which is 99 per cent. pure silica, is about 57 per cent., and with such a glass or one containing more silica, the molten glass will hold the volatile products of the sulfate and chlorid to such an extent that a glass of the desired opacity or color is secured, unless the glass is heated too long or at too high a temperature, in which case there is a tendency for the glass to return to a clear colorless state.

If desired, a part of the silica in the batch may be provided by the use of a feldspar, which feldspar would also serve to supply aluminum oxid. I have found, however, that it is not feasible to supply all of the aluminum oxid necessary in this way, since at best only a very lightly colored glass will be secured, my experiments indicating that a part of the aluminum at least must be supplied in the form of aluminum oxid or aluminum hydrate, in order to produce a satisfactory glass. Aluminum hydrate is used, since this is the commercial form in which aluminum oxid may be secured, but it will be understood that there is no reason why the aluminum oxid should not be used if it were commercially available. Aluminum hydrate ($Al_2H_6O_6$) contains about 65 per cent. of aluminum oxid ($Al_2O_3$), so that the 13.42 per cent. of aluminum hydrate specified in the table corresponds to 8.76 per cent. of aluminum oxid, and since aluminum oxid might be supplied in other compounds aside from the hydrate, the term "aluminum oxid" is used in the claims to make it clear that the invention contemplates the use of the aluminum oxid whether introduced in aluminum hydrate or other compounds.

The invention is directed toward the production of the type of glass set forth in the statement of invention without the use of fluorin compounds, but it will be understood that minute or accidental quantities of fluorin in my batch would be in no way detrimental, and would in fact slightly increase the opacity. The quantity of aluminum hydrate, sulfate, chlorid and phosphate may also be varied within a considerable range without departing from the invention. If these opacifying compounds are reduced the amount of color in the glass is reduced, and this may be desirable, depending upon the thickness of the article produced. On the other hand the amount of coloring ingredients may be greatly increased, and such increase may or may not increase the opacity depending upon the treatment of the glass. Any excess of sodium sulfate or sodium chlorid will appear upon the surface of the melted glass as what is known as "salt water" and may be skimmed off. Such excess is objectionable but not at all fatal to the successful practice of the invention, and my invention contemplates a procedure which would involve the use of more of the opacifying ingredients than is absolutely necessary.

What I claim is:

1. A white semi-translucent illuminating glass substantially free from fire, formed by fusing together a foundation mixture capable of making substantially colorless clear glass and opacifying substances substantially free from fluorin ingredients and comprising aluminum oxid, and an agent having the coloring reaction or effect characteristic of sodium chlorid.

2. A white semi-translucent illuminating glass substantially free from fire, formed by fusing together a foundation mixture capable of making substantially colorless clear glass and opacifying substances substantially free from fluorin ingredients and comprising aluminum oxid and a sulfate.

3. A white semi-translucent illuminating glass substantially free from fire formed by fusing together a foundation mixture capable of making substantially colorless clear glass and opacifying substances substantially free from fluorin ingredients and comprising aluminum oxid, and an agent consisting of sodium chlorid and a sulfate.

4. A white semi-translucent illuminating glass substantially free from fire formed by fusing together a foundation mixture capable of making substantially colorless clear glass and opacifying substances substantially free from fluorin ingredients and comprising aluminum oxid, an agent having the coloring reaction or effect characteristic of sodium chlorid, and a phosphate.

5. A white semi-translucent illuminating glass substantially free from fire, formed by fusing together a foundation mixture capable of making substantially colorless clear glass and opacifying substances substantially free from fluorin ingredients and comprising aluminum oxid, an agent consisting of sodium chlorid and a sulfate, and a phosphate.

6. A white semi-translucent illuminating glass substantially free from fire formed by fusing together a foundation mixture capable of making substantially colorless clear glass and opacifying substances substantially free from fluorin ingredients comprising at least 5 per cent. of aluminum oxid together with at least .8 per cent. of an agent having the coloring reaction or effect characteristic of sodium chlorid.

7. A white semi-translucent illuminating glass substantially free from fire formed by fusing together a foundation mixture capable of making substantially colorless clear glass and opacifying substances substantially free from fluorin ingredients comprising at least 5 per cent. of aluminum oxid together with sodium chlorid and a sulfate together amounting to at least .8 per cent. of the total batch.

8. A white semi-translucent illuminating glass substantially free from fire containing at least 55 per cent. of silica and formed by fusing together a foundation mixture capable of making substantially colorless clear glass and opacifying substances substantially free from fluorin ingredients and comprising aluminum oxid, and an agent having the coloring reaction or effect characteristic of sodium chlorid.

9. A white semi-translucent glass substantially free from fire containing at least 55 per cent. of silica and formed by fusing together a foundation mixture capable of making substantially clear colorless glass, and opacifying substance substantially free from fluorin ingredients and comprising at least 5 per cent. of aluminum oxid and at least .8 per cent. of an agent having the coloring reaction and effect characteristic of sodium chlorid.

10. A white semi-translucent illuminating glass free from fire and formed by fusing together a foundation lead soda batch with opacifying substances free from fluorin ingredients and comprising aluminum oxid, and an agent having the coloring effect or reaction characteristic of sodium chlorid.

11. A white semi-translucent illuminating glass free from fire and formed by fusing together a foundation lead soda batch with opacifying substances free from fluorin ingredients and comprising aluminum oxid, and an agent consisting of sodium chlorid and a sulfate.

12. A white semi-translucent illuminating glass free from fire and formed by fusing together a foundation lead soda batch with opacifying substances free from fluorin ingredients and comprising aluminum oxid, a phosphate, and an agent having the coloring effect or reaction characteristic of sodium chlorid.

JAMES O. HANDY.